United States Patent
Kino et al.

(10) Patent No.: US 7,273,121 B2
(45) Date of Patent: Sep. 25, 2007

(54) AUTOMOTIVE AIR INDUCTION DUCT

(75) Inventors: Hitoshi Kino, Aichi (JP); Hiroshi Iwao, Aichi (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 57 days.

(21) Appl. No.: 11/313,929

(22) Filed: Dec. 22, 2005

(65) Prior Publication Data

US 2006/0137644 A1    Jun. 29, 2006

(30) Foreign Application Priority Data

Dec. 28, 2004   (JP)   ............................. 2004-379635

(51) Int. Cl.
*B60K 13/06*   (2006.01)
(52) U.S. Cl. .................... 180/68.3; 180/68.1
(58) Field of Classification Search .............. 180/68.1, 180/68.2, 68.3, 69.2
See application file for complete search history.

(56) References Cited

U.S. PATENT DOCUMENTS

| | | | | |
|---|---|---|---|---|
| 3,616,871 A | * | 11/1971 | West ......................... | 180/68.1 |
| 4,420,057 A | * | 12/1983 | Omote et al. ............... | 180/68.3 |
| 4,548,166 A | * | 10/1985 | Gest ......................... | 123/198 E |
| 4,831,981 A | * | 5/1989 | Kitano ...................... | 123/198 E |
| 5,022,479 A | * | 6/1991 | Kiser et al. ................ | 180/68.3 |
| 5,564,513 A | * | 10/1996 | Wible et al. ............... | 180/68.3 |
| 5,660,243 A | * | 8/1997 | Anzalone et al. .......... | 180/68.1 |
| 5,860,685 A | * | 1/1999 | Horney et al. .............. | 293/113 |
| 6,302,228 B1 | * | 10/2001 | Cottereau et al. .......... | 180/68.1 |
| 6,698,539 B2 | * | 3/2004 | Decuir ...................... | 180/68.3 |
| 6,880,655 B2 | * | 4/2005 | Suwa et al. ................ | 180/68.1 |

FOREIGN PATENT DOCUMENTS

| | | |
|---|---|---|
| JP | 2004-124757 | 4/2004 |
| JP | 2004-183514 | 7/2004 |
| JP | 2004-230942 | 8/2004 |

* cited by examiner

*Primary Examiner*—Jeff Restifo
(74) *Attorney, Agent, or Firm*—Posz Law Group, PLC

(57) ABSTRACT

A raised distal end portion of a strut portion is in a non-joined state to a back side of an upper duct wall portion and is made up of a spherical abutting and sliding portion which can be brought into abutment with the back side by virtue of point contact and which is allowed to slide relative to the back side. When a downward pressure is exerted on to the spherical abutting and sliding portion from the upper duct wall portion, the spherical abutting and sliding portion is caused to slide relative to the back side and a root portion of the strut portion is deformed at the same time, whereby the strut portion is allowed to incline and fall obliquely downwards.

14 Claims, 4 Drawing Sheets

AUTOMOTIVE AIR INDUCTION DUCT

This application is based on Japanese Patent Application No. 2004-379635, which is incorporated herein by reference.

BACKGROUND OF THE INVENTION

1. Field of the Invention

The present invention relates to an automotive air induction duct, and more particularly to an automotive air induction duct in which a strut portion is improved which is provided as a so-called reinforcement rib which secures a rigidity required to resist a manifold air pressure of the like.

2. Description of the Related Art

An automotive air induction duct is such as to increase the combustion efficiency of an engine so as to increase the output of the engine by supplying outside air taken into from the outside to the engine via an air cleaner. The automotive air induction duct is sometimes placed so that an air induction opening, which is made to open towards a front of the vehicle, is positioned within a space defined between a hood (a bonnet, a hood panel) and an upper radiator support at a front part of a vehicle body in order to take in outside air efficiently while the vehicle is running.

Manifold air pressure (a negative pressure generated when the internal pressure in the induction duct becomes lower than the atmospheric pressure by virtue of vacuum) is exerted on the automotive air induction duct when outside air is taken thereinto in association with the start of the engine. Due to this, unless the induction duct has a rigidity which can bear the manifold air pressure so exerted, the upper duct wall portion and the lower duct wall portion are deformed in such a manner as to approach each other, and in the worst case, there is caused a risk that the induction duct is deformed to be collapsed, whereby the air induction opening is closed. As this occurs, a required amount of outside air cannot be introduced into the engine, leading to the occurrence of a problem that the output of the engine is reduced.

In addition, in case hot air within an engine compartment is taken into the air induction duct, the inherent function of the air induction duct to supply a predetermined amount of air for the engine cannot be fulfilled, calling for a reduction in combustion efficiency. To cope with this, there sometimes occurs a case where a sealing mechanism for preventing the suction of hot air into the induction duct is provided in a space defined between the hood and the upper duct wall portion. With the seal member provided on the hood side like this, however, in the event that an external load is exerted on the hood, the load so exerted is exerted, in turn, on the upper duct wall portion via the seal member. As this occurs, in case the air induction duct is deformed when such an external load that is to be exerted by, for example, the hand of a human being is exerted on to the hood, the engine performance is also affected. Due to this, a rigidity is required for the air induction duct which can bear such an external load that is to be exerted by, for example, the hand of a human being even when the load is actually exerted on to the hood. Consequently, a countermeasures is on demand for the automotive induction ducts against an easy deformation of the upper duct wall portion by virtue of the manifold air pressure and the external load exerted from the hood via the seal member.

On the other hand, in recent years, safety measures to protect pedestrians have been required to be established, and to meet this requirement, a pedestrian injury reduction body has been under development in which when a running vehicle happens to erroneously collide against a pedestrian, an impact generated by the collision can be absorbed by virtue of a proper deformation of the body of the vehicle such as the hood. In the pedestrian injury reduction body like this, in order to realize effectively the alleviation of the seriousness of an injury that the pedestrian is to suffer from by virtue of absorption of the impact, the air induction duct lying below the hood via the sealing mechanism has to be such as to permit a proper depressed deformation of the hood when colliding against the pedestrian. Note that in the event that the sealing mechanism is not provided in the space defined between the hood and the air induction duct, it is understood that the permitted deformation amount of the hood is increased by such an extent that the sealing mechanism does not exist. However, the limited space within the engine compartment makes it difficult to secure a large space between the hood and the upper duct wall portion. Due to this, even in a case where the sealing mechanism is not provided, since, in case the hood is deformed, the hood is brought into abutment with the upper duct wall portion substantially at the same time, the air induction duct also has to be such as to permit a proper deformation of the hood.

Then, there are known automotive air induction ducts which permit a proper deformation of the hood as in the case of an accident such as a collision while normally realizing the increase in rigidity so as to resist the manifold air pressure or the like (for example, refer to JP-A-2004-124757 (FIGS. 1, 2, 6, 8), JP-A-2004-183514 (FIGS. 1, 3, 5, 7)).

The automotive air induction duct disclosed in JP-A-2004-124757 is such as to be molded from a resin material and is, as shown in FIG. 7, made up of an upper duct wall portion 81 disposed close to a back side of a hood of a vehicle, a lower duct wall portion 83 which is disposed to oppositely face the upper duct wall portion 81 at such an interval as to secure a required space therebetween so as to form together with the upper duct wall portion 81 an air induction opening which is made to open towards a front of the vehicle and an air induction passageway which supplies outside air taken into from the air induction opening for an engine, and a support wall portion 85 as a support portion which rises integrally from the lower duct wall portion 83 in such a manner that a flat surface-shaped support portion 84, which is a raised distal end surface, is joined to a back side of the lower duct wall portion 83 by virtue of fusion bonding so as to support the upper duct wall portion 81. In addition, a breakage expectation line 86 is provided at an area where the support wall portion 85 continuously connects to the lower duct wall portion 83 in such a manner as to surround the support wall portion 85. This breakage expectation line 86 is constituted by a plurality of thinned portions 87 provided rectilinearly at required intervals at the continuously connecting area of the support wall portion 85 to the lower duct wall portion 83 (or by a thinned portion provided to extend rectilinearly along the full circumference of the continuously connecting area).

In this automotive air induction duct, when the hood is deformed downwards as a result of a collision with a pedestrian, whereby the upper duct wall 81 is depressed from above together with an impact force, the support wall portion 85 receives the pressure from the upper duct wall portion 81 at the flat surface-shaped support portion 84 and is then depressed downwards without being subjected to a buckling deformation thereof. As this occurs, since a stress by the pressure is exerted on to the thinned portion 87 which forms the breakage expectation line 86, a breakage is generated along the breakage expectation line 86, and the support wall portion 85 is separated from the lower duct wall portion 83 and is allowed to move downwards. As a result, a further deformation of the hood is permitted along with the sinking of the upper duct wall portion 81.

In addition, the automotive air induction duct disclosed in JP-A-2004-183514 is such as to be molded similarly from a resin material, has the same basic configuration as the automotive air induction duct disclosed in JP-A-2004-124757 and is, as shown in FIG. 8, made up of the upper duct wall portion 81, the lower duct wall portion 83 and a support wall portion 85 having the flat surface-shaped support portion 84. Then, oppositely facing side wall portions of the support wall portion 85 are bent at an intermediate location thereof, so that the side wall portions are each made up of a primary support portion 88 which is situated on an upper duct wall portion 81 side and which extends at a primary inclined angle $\alpha$ relative to a vertical direction and a secondary support portion 89 which continuously connects to the primary support portion 88 in a bent fashion so as to be situated on a lower duct wall portion 83 side and extends at a secondary inclined angle $\beta$ which is larger than the primary inclined angle $\alpha$. Namely, the side wall portions of the support wall portion 85 is flared from a distal end side to a proximal end side thereof, and the degree of flare of the secondary support portion is made larger than the degree of flare of the primary support portion 81.

In this automotive air induction duct, similar to the automotive air induction duct disclosed in JP-A-2004-124757, when the hood is deformed downwards as a result of a collision with a pedestrian, whereby the upper duct wall 81 is depressed from above together with an impact force, the flat surface-shaped support portion 84 of the support wall portion 85 receives the pressure so exerted on the surface thereof. The support wall portion 85, in which the pressure is received by the flat surface-shaped support portion 84, is folded further in such a manner that the bent portions on the side wall portions approach each other and is deformed into a curved shape in such a manner that the primary support portion 88 expands outwards, whereby the support wall portion 85 is deformed into a collapsed state where the support wall portion 85 is entirely collapsed. As a result, a further deformation of the hood is permitted along with the sinking of the upper duct wall portion 81.

Note that both FIGS. 7 and 8 are sectional views showing cross sections of flow paths of air induction passageways 82 (sectional views taken along planes normal to an air flow direction in which outside air taken into from the air induction opening flows inside the air induction passageway) and that in the automotive air induction ducts disclosed in Patent JP-A-2004-124757 and JP-A-2004-183514, the external shape of the cross section of the support wall portion 85 on the cross section of the flow path of the air induction passageway 82 is formed substantially into a trapezoidal shape. In addition, both the automotive air induction ducts are such as to be molded by virtue of blow molding, and the back side of the upper duct wall portion 81 and the flat surface-shaped support portion 84 of the support wall portion 85 are joined together through fusion bonding.

However, in the related automotive air induction duct disclosed in JP-A-2004-124757, the further deformation of the hood is permitted due to the support wall portion 85, in which the pressure from the upper duct wall portion 81 is received by the flat surface-shaped support portion 84, being broken along the breakage expectation line 86 to thereby be separated downwards from the lower duct wall portion 83. Due to this, after the further deformation of the hood has been permitted so as to absorb the impact generated by the collision with the human being, a hole is formed in the lower duct wall portion 83 due to the breakage of the breakage expectation line 86. As this occurs, since hot air within the engine compartment is introduced into the air induction duct, there may be called for a risk that the engine is caused to fail by the hot air introduced into the air induction duct, for example, when the vehicle needs to be moved after the accident. In addition, the reuse of the lower duct wall portion 83 which now has the hole opened therein becomes impossible.

On the other hand, in the related automotive air induction duct disclosed in JP-A-2004-183514, the further deformation of the hood is permitted due to the support wall portion 85, in which the pressure from the upper duct wall portion 81 is received by the flat surface-shaped support portion 84, being deformed into the collapsed state. In addition, since this support wall portion 85 is deformed into the collapsed state due to the support wall portion 85 being folded further largely in the direction the bent portions on both the side wall portions approach each other when a certain large load is exerted thereon, once the support wall portion 85 is deformed into the collapsed state, it is difficult for the support wall portion 85 to be restored to its original shape (or a shape close to the original shape, and this will be true hereinafter), and even in case the pressure exerted on the support wall portion 85 from the upper duct wall portion 81 is removed, it is considered that the restoration of the support wall portion 85 to its original shape is difficult. Due to this, this automotive air induction duct has a poor reusability once it has been deformed.

In addition, in the support wall portion 85 which has been deformed into the collapsed state, the support wall portion 85 is deformed in the curved shape in the direction in which the primary support portions 88 expand outwards (in a direction in which the cross sectional area of the flow path of the air induction passageway is narrowed). Namely, the deformation of the support wall portion 85 encompasses a deformation which reduces the cross sectional area of the flow path of the air induction passageway 82 (a curved deformation of both the side wall portions). The deformation which reduces the cross sectional area of the flow path of the air induction passageway 82 becomes disadvantageous in supplying a required amount of outside air for the engine. Due to this, there may be called for a risk that the engine is caused to fail due to the lack of air, for example, when the vehicle needs to be moved after the accident.

SUMMARY OF THE INVENTION

The invention was made in view of the situations, and a technical problem that the invention is to solve is to provide an automotive air induction duct which permits a further deformation of a hood by virtue of the deformation of a support portion which supports an upper duct wall portion, wherein there are called for few risks that an engine is caused to fail due to the supply of hot air and the lack of air even after the deformation of the support portion and a high reusability is provided.

With a view to solving the problem, according to the invention, there is provided an automotive air induction duct of a synthetic resin comprising an upper duct wall portion disposed close to a back side of a hood of a vehicle, a lower duct wall portion disposed to oppositely face the upper duct wall portion at such an interval as to secure a required space therebetween so as, together with the upper duct wall portion, to form an air induction opening which is made to open towards a front of the vehicle and an air induction passageway which supplies outside air taken into from the air induction opening for an engine, a strut portion which rises integrally from the lower duct wall portion so as to be able to support the upper duct wall portion through abutment of a raised distal end portion thereof with the upper duct wall portion, and an abutting and sliding portion which is provided at the raised distal end portion of the strut portion in a non-joined state to a back side of the upper duct wall portion and is able to be brought into abutment with the back side by virtue of point contact or line contact and to slide relative to the back side. Incidentally, the strut portion is allowed to incline and fall obliquely downwards as the abutting and sliding portion is caused to slide relative to the back side and a root portion of the strut portion is deformed by a downward pressure exerted on to the abutting and sliding portion from the upper duct wall portion.

Here, the "abutting and sliding portion is able to be brought into abutment with the back side by virtue of point contact or line contact" means that the abutting and sliding portion is in a state where it is in abutment with or close to the back side of the upper duct wall portion in a normal state where no external load is exerted on the upper duct wall portion from above, that the abutting and sliding portion which is in the abutment state in the normal state is in abutment with the back side by virtue of point contact or line contact, not surface contact, and that when the abutting and sliding portion which is in the state where it is close to the back side in the normal state is brought into abutment with the back side by an external load exerted on to the upper duct wall portion from above, the abutting and sliding portion is brought into abutment with the back side by virtue of point contact or line contact, not surface contact.

In the automotive air induction duct of the invention which has the strut portion which is configured as described above, when the hood is deformed downwards by a collision with a pedestrian, whereby the upper duct wall portion is depressed along with an impact force from above, a downward pressure is exerted on the abutting and sliding portion of the strut portion from the upper duct wall portion. As this occurs, since in the real world, there exists almost no possibility that the pressure is exerted on the center of the abutting and sliding portion direct from thereabove only in a vertical direction, almost all the pressure exerted downwards on to the abutting and sliding portion from the upper duct wall portion is to be exerted obliquely downwards relative to the center of the abutting and sliding portion. On the other hand, as long as there exists below the strut portion nothing which restrains the downward deformation of the root portion of the strut portion, the root portion of the strut portion can be deformed in such a manner as to rise or expand downwards from the lower duct wall portion. In addition, in a normal body, an open distal end portion of the lower duct wall portion which lies on the air induction opening side is placed on an upper radiator support, and at any position situated further rearwards than the open distal end portion of the lower duct wall portion which is placed on the radiator support, there exists below the lower duct wall portion nothing which restrains the downward deformation of the root portion of the strut portion. Due to this, when an external load is exerted on to the hood, the abutting and sliding portion, which is in the non-joined state to the back side of the upper duct wall portion, slides (moves while sliding) relative to the back side, and the root portion of the strut portion deforms (the root portion lying on the side to which the strut portion falls is deformed in such a manner as to rise or expand downwards from the lower duct wall portion, whereby the strut portion inclines obliquely downwards. As a result, a further deformation of the hood is permitted along with the sinking of the upper duct wall portion.

Note that while it is impossible to occur in the real world, even in the event that the pressure is exerted on to the center of the abutting and sliding portion direct from thereabove only in the vertical direction, as will be described later on, in the case of the strut portion in which the center of the abutting and sliding portion is offset relative to the center of the root portion, since the shape of the strut portion facilitates that the strut portion inclines and falls in the direction in which the center of the abutting and sliding portion is so offset, the strut portion easily inclines and falls along with the deformation of the root portion triggered on the side to which the center of the abutting and sliding portion is so offset (the side to which the strut portion falls) in such a manner that the root portion rises downwards from the lower duct wall portion.

Then, even after the strut portion which supports the upper duct wall portion has been deformed, there is formed no hole in the lower duct wall portion of the air induction duct. By virtue of this, it is possible to prevent the occurrence of an engine failure due to the suction of hot air within the engine compartment into the air induction duct, and the reusability can be increased.

In addition, the abutting and sliding portion is brought into abutment with the back side of the upper duct wall portion at a small contact area realized by virtue of point contact or line contact, whereby the abutting and sliding portion is made to easily slide relative to the back side. Due to this, the sliding of the abutting and sliding portion over the back side does not produce a large resistance when the strut portion inclines and falls. Consequently, the strut portion is made to incline and fall by a lower load and is, hence, made to ensure the permission of the further deformation of the hood. Consequently, it is possible to avoid a problem that when a pedestrian collides against the hood, a further deformation of the hood is restricted to thereby reduce the impact absorption performance. In addition, since the strut portion inclines and falls along with the deformation of the root portion (namely, a boundary portion between the strut portion and the lower duct wall portion or the vicinity thereof) which constitutes a relatively large area, the degree of the deformation occurring when the strut portion inclines and falls becomes relatively small. Thus, it becomes easy to restore the strut portion which has been deformed by a smaller load and with a relatively small degree of deformation along with the deformation of the root portion. Consequently, it is highly possible that the air induction duct of the invention can be reused even after the strut portion has been deformed so as to permit the further deformation of the hood.

Furthermore, when permitting the further deformation of the hood, the strut portion only deforms in such a manner as to incline and fall obliquely downwards along with the deformation of the root portion but does not deform in such a manner as to increase its own volume. Namely, the deformation of the strut portion itself does not encompass the deformation of the support wall portion in JP-A-2004-183514 in which the cross sectional area of the air induction passageway (the curved deformation of both the side wall portions) is narrowed. Accordingly, even after the strut portion has been deformed, while the cross sectional area of the flow path of the air induction passageway is reduced due to the space between the upper duct wall portion and the lower duct wall portion being narrowed due to the inclination and fall of the strut portion, the sectional area of the flow path of the air induction passageway is not reduced by the deformation of the strut portion itself. In addition, since the abutting and sliding portion of the strut portion is in the non-joined state to the upper duct wall portion, even in the event that the deformed strut portion cannot be restored to its original shape, the restoration of only the upper duct wall portion to its original shape can restore the original size of the cross sectional area of the flow path of the air induction passageway (or a size close to the original size, and this is true hereinafter). Consequently, the automotive air induction duct of the invention is advantageous in securing the cross sectional area of the air induction passageway, even after the strut portion has been deformed so as to permit the further deformation of the hood and can reduce the risk that the engine fails due to the lack of air that is to be supplied to the engine.

Preferably, the abutting and sliding portion is a spherical abutting and sliding portion which can be brought into abutment with the back side of the upper duct wall portion by virtue of point contact. According to the spherical abutting and sliding portion which can be brought into abutment with the back side of the upper duct wall portion by virtue of point contact, since the sliding relative to the back side is facilitated while the contact area with the back side is minimized, the strut portion can be made to easily incline and fall by a lower load.

Preferably, the strut portion is such that a center of the abutting and sliding portion is offset relative to a center of the root portion. The strut portion in which the abutting and sliding portion is offset relative to the root portion is such that the abutting and sliding portion is inclined in advance in the direction in which the abutting and sliding portion is so offset. Due to this, this strut portion is made to easily incline and fall in the direction in which the abutting and sliding portion is offset relative to the root portion. Consequently, the strut portion is made to easily incline and fall in the direction in which the abutting and sliding portion is so offset irrespective of the direction of the pressure exerted on to the abutting and sliding portion from the upper duct wall portion, in other words, irrespective of the position of the external load exerted on the hood. In particular, in the event that the pressure directed towards the direction in which the abutting and sliding portion is offset relative to the root portion is exerted on to the abutting and sliding portion from the upper duct wall portion, the strut portion inclines and falls more easily. In addition, even in the event that the pressure is exerted on to the center of the abutting and sliding portion direct from thereabove in the vertical direction, since the strut portion is inclined in advance in the direction in which the abutting and sliding portion is so offset, the strut portion easily inclines and falls in that direction.

Preferably, the center of the abutting and sliding portion is offset so as to be displaced deeper into the air induction passageway than the center of the root portion of the strut portion. In the event that the center of the abutting and sliding portion is displaced deeper into the air induction passageway than the center of the root portion, the strut portion is made to easily incline and fall towards a deeper side of the air induction passageway or along a direction in which outside air taken into from the air induction opening flows through the air induction passageway. Due to this, a ratio of the cross sectional area of the flow path of the air induction passageway that is reduced by the existence of the strut portion that has so inclined or fallen is reduced. In addition, the space between the hood of the vehicle and the upper duct wall portion of the air induction duct is generally narrowed as it approaches the front side of the vehicle, and in the vehicle configured like this, the pressure tends to be easily exerted on to the upper duct wall portion from the hood at the front end of the vehicle. Due to this, in the event that the strut portion is made to easily incline and fall in the direction directed from the side of the air induction opening which is made to open at the front end of the vehicle towards the deeper side of the air induction passageway, the pressure exerted on the front end of the vehicle makes the strut portion to incline and fall more easily with a lower load.

Preferably, the strut portion is provided in the vicinity of the air induction opening. Since the rigidity is lower in the vicinity of the air induction opening which constitutes an open end of the air induction passageway than any other locations, the air induction duct is easily deformed at the relative location by virtue of a normal manifold air pressure. In this respect, in the event that the strut portion is provided in the vicinity of the air induction opening, an increase in rigidity in the vicinity of the air induction opening can be realized, thereby making it possible to resist effectively the normal manifold air pressure or the like. In addition, as to the inclination and fall of the strut portion from the root portion, since the surface deformation of the flat portion of the lower duct wall portion occurs at the same time as the deformation of the root portion of the strut portion in which the root portion rises downwards from the lower duct wall portion, the strut portion is made to incline and fall more easily by being provided in the vicinity of the air induction opening.

In a case where the air induction duct of the invention is applied to a form of utilization in which the open distal end portion of the lower duct wall portion which lies on the air induction opening side is placed on the upper radiator support, the strut portion is preferably provided at a location on the lower duct wall portion which is in the vicinity of the air induction opening but which excludes the open distal end portion thereof.

Consequently, according to the automotive air induction duct of the invention, even after the strut portion has been deformed so as to permit the further deformation of the hood, there are called for few risks that an engine is caused to fail due to the supply of hot air and the lack of air, and the possibility of reuse is increased.

DETAILED DESCRIPTION OF THE PREFERRED EMBODIMENTS

Hereinafter, specific embodiments of automotive air induction ducts of the invention will be described by reference to the drawings.

Embodiment 1

Figure 1:
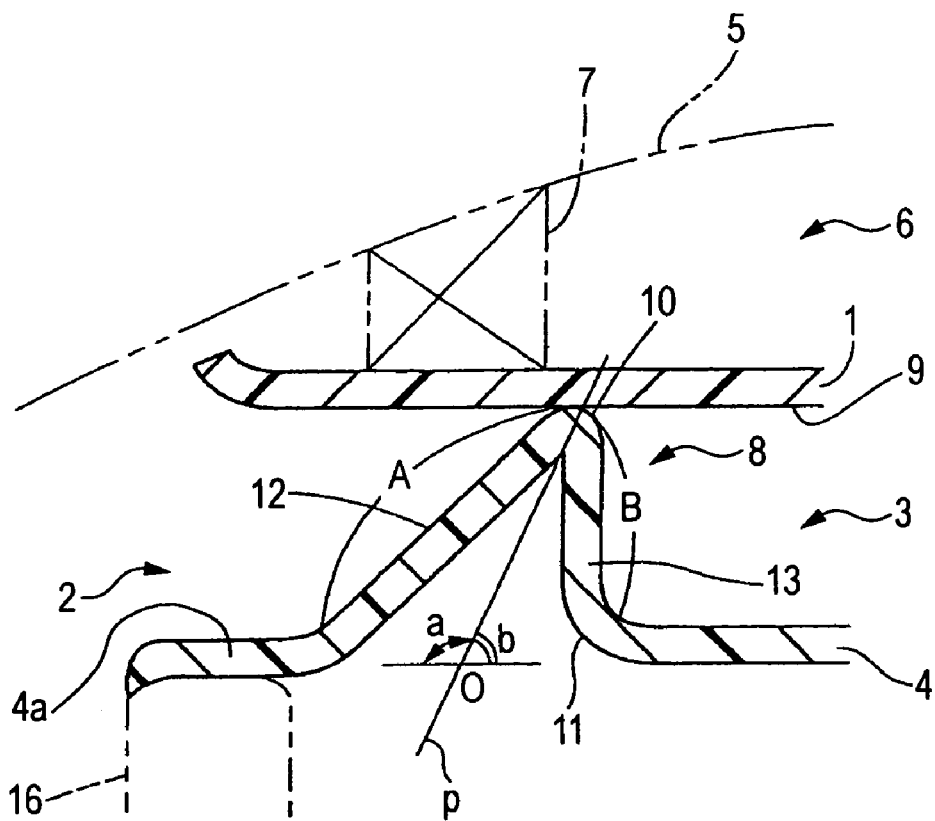
FIG. 1 is a partial sectional view taken along the line X-X in FIG. 3, which shows an automotive air induction duct according to Embodiment 1 of the invention.
Figure 2:
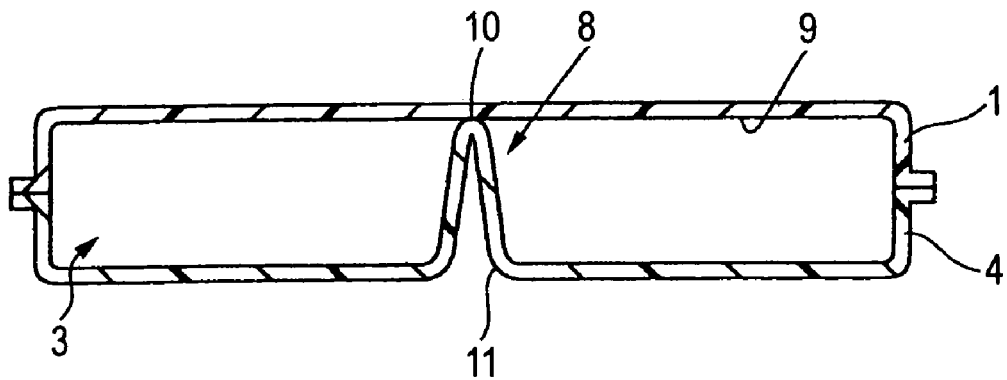
FIG. 2 is a partial sectional view taken along the line Y-Y in FIG. 3, which shows the automotive air induction duct according to Embodiment 1 of the invention.
Figure 3:
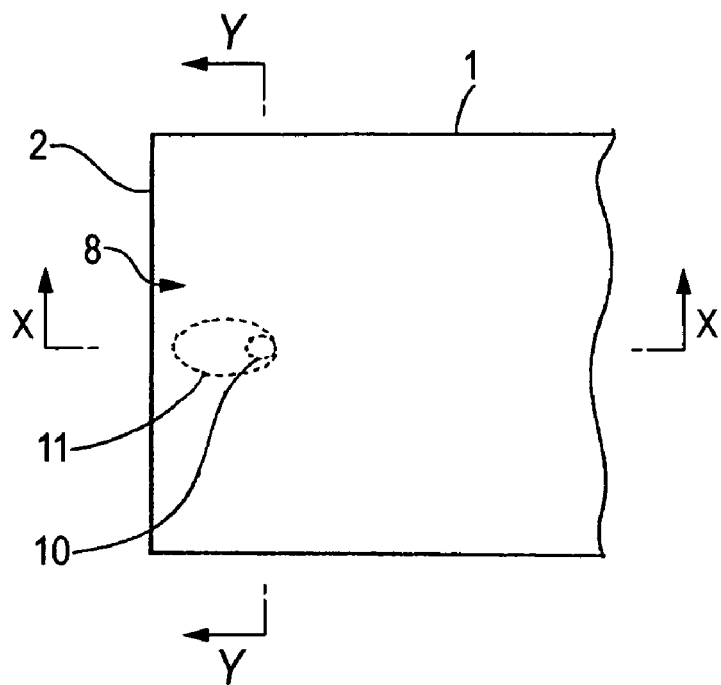
FIG. 3 is a partial plan view resulting when the automotive air induction duct according to Embodiment 1 of the invention is viewed from the top thereof.

As shown in FIGS. 1 to 3, an automotive air induction duct of this embodiment includes an upper duct wall portion 1 and a lower duct wall portion 4 disposed to oppositely face the upper duct wall portion 1 at such an interval as to secure a required space therebetween so as to form together with the upper duct wall portion 1 a transversely elongated air induction opening 2 and an air induction passageway 3 which supplies outside air taken into from the air induction opening 2 for an engine, and oppositely facing side edge portions of the upper duct wall portion 1 and the lower duct wall portion 4 are integrally joined together by fastening them together with bolts, so as to form a hollow unit. In addition, an end portion of the air induction duct which is opposite to the air induction opening 2 is made into a connection opening, not shown, which can be connected to an air cleaner, not shown.

This automotive air induction duct is, as shown in FIG. 1, provided for use in a space defined between a hood 5 of a vehicle and an upper radiator support 16 with the air induction opening 2 oriented towards a front of the vehicle (to the left in FIG. 1). In addition, the air induction duct is fixed with bolts in such a state that an open distal end portion 4a of the lower duct wall portion 4 which lies on an air induction opening 2 side thereof is placed on the upper radiator support 16. Then, when in use, nothing exists below a root portion 11 of a strut portion 8, which will be described later on, which restrains a downward deformation of the strut portion 8. In addition, a sealing mechanism 7, which prevents the suction of hot air within an engine compartment 6 into the air induction duct, is provided in a space defined between the hood 5 and the upper duct wall portion 1.

Both the upper duct wall portion 1 and the lower duct wall portion 4 are such as to be molded from a synthetic resin material such as polyethylene (PE) or polypropylene (PP) into a flat tray shape by virtue of injection molding. The thickness of the upper duct wall portion 1 and the lower duct wall portion 4 can be in a range from 0.5 to 3.5 mm.

In addition, the strut portion 8 is provided on the lower duct wall portion 4 at a location which is in the vicinity of the air induction opening 2 but which excludes the open distal end portion 4a that is placed on the upper radiator support 16 in such a manner as to integrally rise from the lower duct wall portion 4 so that a raised distal end portion thereof is brought into abutment with the upper duct wall portion 1 to thereby support the upper duct wall portion 1. The raised distal end portion of the strut portion 8 is in a non-joined state to a back side 9 of the upper duct wall portion 1 and is made up of a spherical abutting and sliding portion 10 which can be brought into abutment with the back side by virtue of point contact and which can slide relative to the back side 9. In addition, the strut portion 8 is such that a center of the spherical abutting and sliding portion 10, which lies on a distal end side of the strut portion 8, is offset relative to a center O of the root portion 11 which lies on a proximal end side of the strut portion 8 in such a manner as to be displaced deeper into the air induction passageway 3 by a predetermined amount (on the order of 5 to 10 mm).

To be specific, the center of the spherical abutting and sliding portion 10 is offset relative to the center O of the root portion 11 in such a manner as to be displaced deeper into the air induction passageway 3 along a direction in which outside air taken into from the air induction opening 2 flow through the air induction passageway 3 (a direction in which the air induction passageway 3 extends), whereby on a cross section taken along a plane passing through the center of the spherical abutting and sliding portion 10 and extending along the direction in which the air induction passageway 3 extends, in a pair of front wall portion 12 and rear wall portion 13 which oppositely face each other along that direction, a length A of the front wall portion 12 is made longer than a length B of the rear wall portion 13 (A>B, refer to FIG. 1). In addition, as to an inclination angle of a straight line P which connects the center O of the root portion with the center of the spherical abutting and sliding portion 10 relative to the lower duct wall portion 4, an inclination angle a on the side of the front wall portion 12 is made larger than an inclination angle b on the side of the rear wall portion 13 (a>b, refer to FIG. 1).

In addition, the external shape of a cross section of the strut portion 8 at the root portion 11 which is taken horizontally along the root portion 11 is made substantially into an elliptic shape elongated in a direction directed from the air induction opening 2 side towards the deeper side of the air induction passageway 3 (a major axis: on the order of 20 to 50 mm, a minor axis: on the order of 20 to 40 mm) (refer to FIG. 3). Note that while the external shape of the cross section of the strut portion 8 at the root portion 11 is preferably formed substantially into the elliptic shape, the external shape of the cross section is not limited thereto but may be formed into a round shape. In addition, the rear wall portion 13 extends substantially vertically relative to the lower duct wall portion 4. Additionally, a rear end portion of the root portion 11 (a deeper end portion of the air induction passageway 3) and the spherical abutting and sliding portion 10 substantially coincide with each other in position, and the spherical abutting and sliding portion 10 is situated substantially direct above the rear end portion of the root portion 11.

Thus, when a downward pressure is exerted on to the spherical abutting and sliding portion 10 from the upper duct wall portion 1, the spherical abutting and sliding portion 10 slides relative to the back side 9 of the upper duct wall portion 1 and hence, the root portion 11 of the strut portion 8 is deformed, whereby the strut portion 8 is allowed to incline and fall obliquely downwards.

In the automotive air induction duct having the strut portion 8 configured as has been described above, when a pedestrian collides against the hood 5, which is deformed downwards, whereby the upper duct wall portion 1 is depressed from above along with an impact force, the downward pressure is exerted on to the spherical abutting and sliding portion 10 of the strut portion 8 from the upper duct wall portion 1. As this occurs, since the possibility that the pressure is exerted on to the center of the spherical abutting and sliding portion 10 direct from thereabove only in the vertical direction is almost nil in the real world, almost all the pressure that is exerted downwards on to the spherical abutting and sliding portion 10 from the upper duct wall portion 1 is to be exerted obliquely downwards relative to the center of the spherical abutting and sliding portion 10. In addition, in the strut portion 8, the center of the spherical abutting and sliding portion 10 is offset relative to the center O of the root portion 11, and hence, the spherical abutting and sliding portion 10 is inclined in advance in the direction in which the center thereof is so offset. Due to this, the strut portion 8 is made to easily incline and fall in the direction in which the spherical abutting and sliding portion 10 is offset relative to the root portion 11. On the other hand, since there exists below the strut portion 8 nothing which restrains the downward deformation of the root portion 11 of the strut portion at the position lying further rearwards on the body than the open distal end portion 4a of the lower duct wall portion 4 which is placed on the upper radiator support 16, the root portion 11 of the strut portion 8 can be deformed in such a manner as to rise or expand downwards from the lower duct wall portion 4 (refer to FIG. 4).

Figure 4:
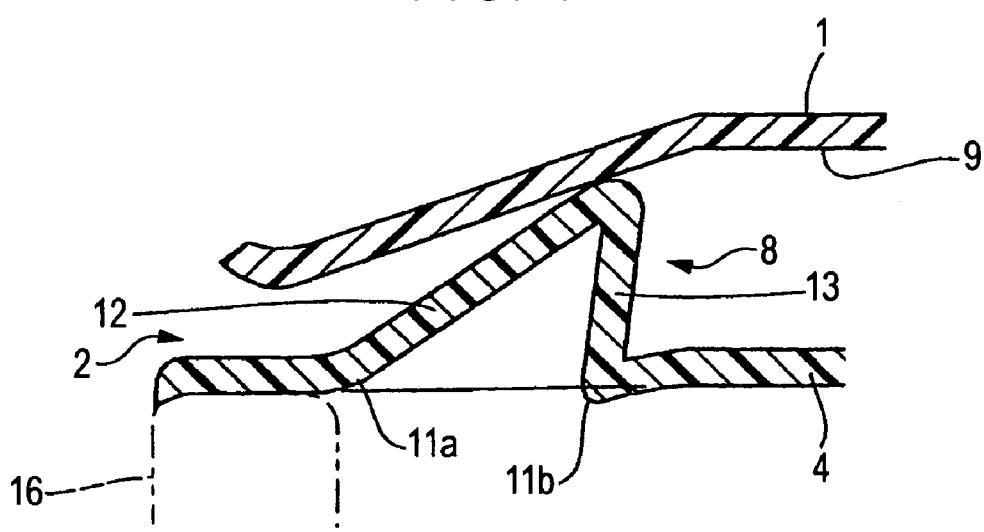
FIG. 4 is a partial sectional view of the automotive induction duct according to Embodiment 1 of the invention taken along the line X-X in FIG. 3, which shows a state in which a strut portion is made to incline and fall.

Here, FIG. 4 shows how the strut portion 8 inclines and falls when the pressure is exerted on to the center of the spherical abutting and sliding portion 10 direct from thereabove in the vertical direction. As shown in the figure, when the pressure is exerted on to the center of the spherical abutting and sliding portion 10 direct from thereabove in the vertical direction, the pressure is then exerted on to the root portion 11b lying on the side of the rear wall portion 13 via the rear wall portion 13 which extends substantially vertically relative to the lower duct wall portion 4, whereby the root portion 11b is deformed in such a manner as to rise or expand downwards from the lower duct wall portion 4, whereas the root portion 11a lying on the side of the front wall portion 12 is deformed in such a manner as to rise upwards or float from the flower duct wall portion 4. Then, the strut portion 8 inclines and falls in such a manner that while the inclination angle b of the rear wall portion 13 relative to the lower duct wall portion 4 becomes smaller as the root portion 11 deforms as has been described just above, the inclination angle a of the front wall portion relative to the lower duct wall portion 4 becomes larger.

Consequently, the strut portion 8 easily inclines and falls in the direction in which the spherical abutting and sliding portion 10 is offset irrespective of the direction of the pressure which is exerted downwards on to the spherical abutting and sliding portion 10 from the upper duct wall portion 1, in other words, irrespective of the position of the external load which is exerted on to the hood 5. In particular, in the event that the pressure directed towards the direction in which the spherical abutting and sliding portion 10 is offset relative to the root portion 11 is exerted on to the spherical abutting and sliding portion 10 from the upper duct wall portion 1, the strut portion 8 inclines and falls more easily. In addition, even in the event that the pressure is exerted on to the center of the spherical abutting and sliding portion 10 direct from thereabove in the vertical direction, since the strut portion 8 is inclined in advance in the direction in which the spherical abutting and sliding portion 10 is so offset, the strut portion 8 easily inclines and falls in that direction along with the deformation of the root portion 11. Consequently, when the external load is exerted on to the hood 5, the spherical abutting and sliding portion 10, which is in the non-joined state to the back side 9 of the upper duct wall portion 1, slides (moves while sliding) relative to the back side 9 and the root portion 11 of the strut portion 8 is deformed the root portion 11 lying on the side to which the support portion 8 falls is deformed in such a manner as to rise or expand downwards from the lower duct wall portion 4 due to all the external load so exerted, whereby the support portion 8 inclines and falls obliquely downwards. As a result, a further deformation of the hood 5 is permitted along with the sinking of the upper duct wall portion 1.

Then, even after the strut portion 8 which supports the upper duct wall portion 1 has been deformed, there is formed no hole in the lower duct wall portion 4 of the air induction duct. Due to this, it is possible to prevent the occurrence of an engine failure due to the suction of hot air within the engine compartment 6 into the air induction duct, and the reusability can be increased.

In addition, the spherical abutting and sliding portion 10 is brought into abutment with the back side 9 of the upper duct wall portion 1 at a small contact area realized by virtue of point contact, whereby the spherical abutting and sliding portion 10 is made to easily slide relative to the back side 9. Due to this, the sliding of the spherical abutting and sliding portion 10 over the back side 9 does not produce a large resistance when the strut portion 8 inclines and falls. Consequently, the strut portion 8 is made to incline and fall by a lower load and is, hence, made to ensure the permission of the further deformation of the hood 5. Consequently, it is possible to avoid a problem that when a pedestrian collides against the hood 5, a further deformation of the hood 5 is restricted to thereby reduce the impact absorption performance. In addition, the strut portion 8 inclines and falls along with the deformation of the root portion. Since the strut portion 8 inclines and falls along with the deformation of the root portion lying on the distal end side (namely, a boundary portion between the strut portion 8 and the lower duct wall portion 1 or the vicinity thereof) which constitutes a relatively large area, the degree of the deformation occurring when the strut portion 8 inclines and falls becomes relatively small. Thus, it becomes easy to restore the strut portion 8 which has been deformed by a smaller load and with a relatively small degree of deformation along with the deformation of the root portion 11. Consequently, it is highly possible that the air induction duct of the embodiment can be reused even after the strut portion 8 has been deformed so as to permit the further deformation of the hood 5.

Furthermore, when permitting the further deformation of the hood 5, the strut portion 8 only deforms in such a manner as to incline and fall obliquely downwards along with the deformation of the root portion 11 but the external shape thereof does not deform in such a manner as to increase its own volume. Namely, the deformation of the strut portion 8 itself does not encompass the deformation in which the cross sectional area of the air induction passageway 3 is narrowed. Due to this, even after the strut portion 8 has been deformed, while the cross sectional area of the flow path of the air induction passageway 3 is reduced due to the space between the upper duct wall portion 1 and the lower duct wall portion 4 being narrowed due to the inclination and fall of the strut portion 8, the sectional area of the flow path of the air induction passageway 3 is not reduced by the deformation of the strut portion 8 itself. In addition, since the spherical abutting and sliding portion 10 of the strut portion 8 is in the non-joined state to the upper duct wall portion 1, even in the event that the deformed strut portion 8 cannot be restored to its original shape, the restoration of only the upper duct wall portion 1 to its original shape can restore the original size of the cross sectional area of the flow path of the air induction passageway 3. Consequently, according to the automotive air induction duct of the embodiment, the risk can be reduced that the engine fails due to the lack of air that is to be supplied to the engine.

In addition, in the strut portion 8 of the air induction duct, the center of the spherical abutting and sliding portion 10 is offset relative to the center O of the root portion 11 in such a manner as to be displaced deeper into the air induction passageway 3, and the strut portion 8 is made to easily incline and fall towards the deeper side of the air induction passageway 3 along the direction in which outside air taken into from the air induction opening 2 flows through the air induction passageway 3. Due to this, when an external load is exerted on to the hood 5 at a position on the vehicle which lies further forwards than the spherical abutting and sliding portion 10, whereby a pressure, which is directed rearwards from the position further forwards than the spherical abutting and sliding portion 10, is exerted on the spherical abutting and sliding portion 10 from the upper duct wall portion 1, the strut portion 8 is made to easily incline and fall in that direction by a lower load.

Thus, according to the automotive air induction duct of the embodiment, even after the strut portion 8 has been deformed so as to permit the further deformation of the hood 5, the risk is reduced that an engine failure is called for due to the supply of hot air into the air induction duct or the lack of air that is to be supplied for the engine, and the possibility of reuse is increased.

In addition, since the strut portion 8 is provided in the vicinity of the air induction opening 2 which is low in rigidity, it is possible to resist the normal manifold air pressure effectively.

Furthermore, the external shape of the cross section of the strut portion 8 on the distal end side thereof where the root portion 11 exists is formed substantially into the elliptic shape which is elongated in the direct ion directed from the side of the air induction opening 2 towards the deeper side of the air induction passageway 3. Namely, the strut portion 8 is elongated in the direction in which air flows within the air induction passageway 3, so that the cross sectional area of the flow path of the air induction passageway 3 and the open ratio of the air induction opening 2 are not reduced to an extreme extent. Consequently, the risk can be suppressed to an extreme extent that the cross sectional area of the flow path of the air induction passageway 3 and the open ratio of the air induction opening 2 are reduced by virtue of the existence of the strut portion 8 both when the air induction duct is in the normal state and after the strut portion 8 has been deformed.

Embodiment 2

Figure 5:
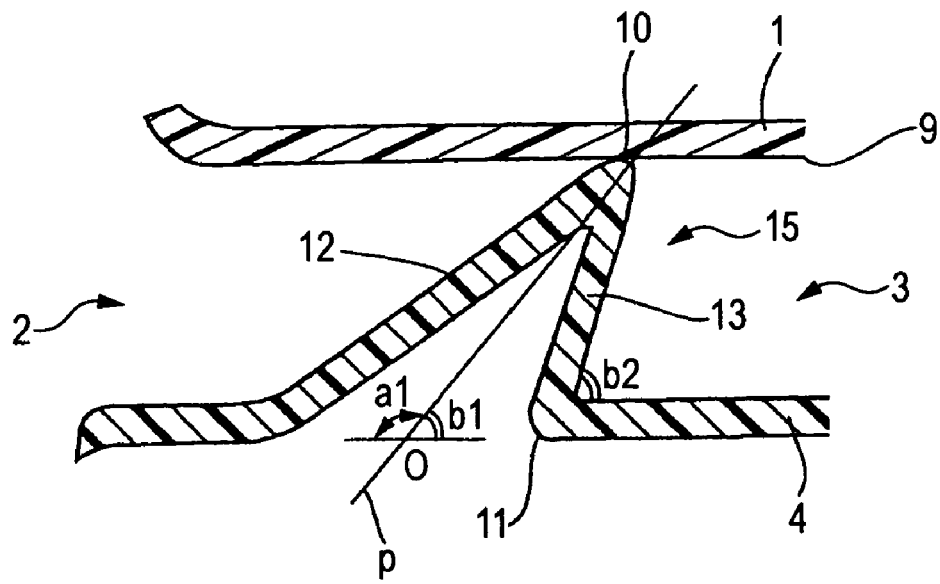
FIG. 5 is a partial sectional view taken along the line X-X in FIG. 3, which shows an automotive air induction duct according to Embodiment 2 of the invention.

A strut portion 15 according to this embodiment shown in FIG. 5 is such that a center of a spherical abutting and sliding portion 10 which lies on a distal end side of the strut portion 15 is largely offset to a deeper side of an air induction passageway 3 relative to a center O of a root portion 11 which lies on a proximal end side thereof.

Namely, in the strut portion 15, an inclination angle of a line P which connects the center O of the root portion with the center of the spherical abutting and sliding portion 10 relative to a lower duct wall portion 4 is such that an inclination angle a1 on the side of a front wall portion 12 is made larger than an inclination angle b1 on the side of a rear wall portion 13 (a1>b1), and a difference (a1−b1) between the inclination angles is made larger than a difference (a−b) in Embodiment 1. In addition, an angle b2 formed by an upper surface of the lower duct wall portion 4 and an external surface of the rear wall portion 13 is made to be smaller than 90 degrees.

Thus, when compared with the strut portion 8 according to Embodiment 1, the strut portion 15 is formed into a shape which allows the strut portion 15 to incline and fall more easily deeper into the air induction passageway 3. Consequently, it is possible to avoid a problem that when a pedestrian collides against the hood 5, a further deformation of the hood 5 is restricted to thereby reduce the impact absorption performance in a more ensured fashion.

In addition, while the rear wall portion 13 is a portion which constitutes an undercut relative to the lower duct wall portion 4 at the time of injection molding, by making a direction in which a molded product is removed from an injection mold coincide with the direction of a straight line P which extends from the center of the spherical abutting and sliding portion 10 to the center O of the root portion 11, the strut portion 15 can be injection molded.

Other configurations, functions and advantages thereof are similar to those of Embodiment 1.

Embodiment 3

Figure 6:
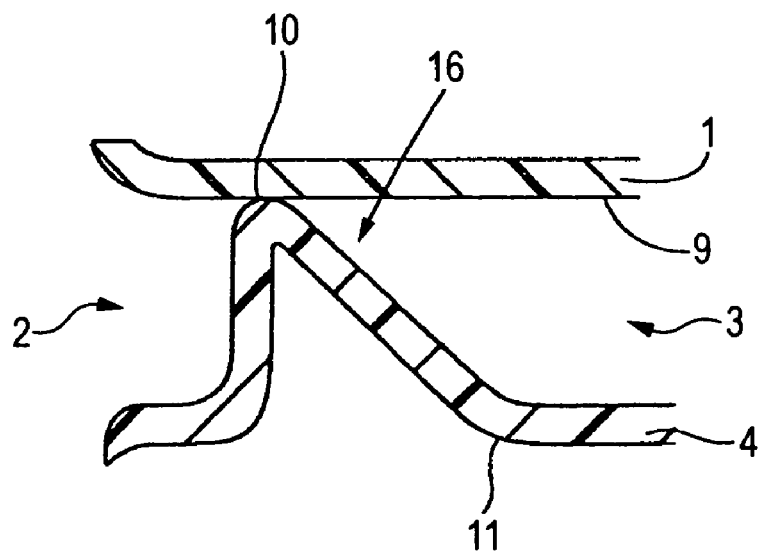
FIG. 6 is a partial sectional view taken along the line Y-Y in FIG. 3, which shows the automotive air induction duct according to Embodiment 2 of the invention.
Figure 7:
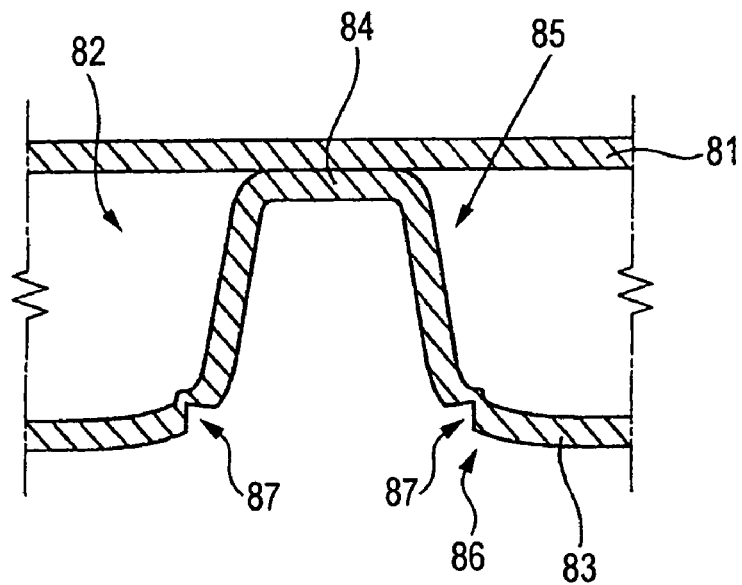
FIG. 7 is A partial sectional view which shows a related automotive air induction duct taken along a cross section of a flow path of an air induction passageway thereof.
Figure 8:
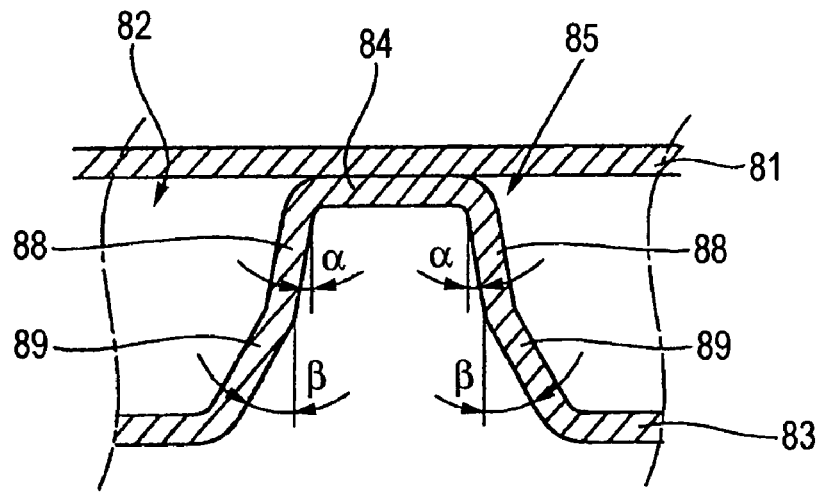
FIG. 8 is a partial sectional view which shows another related automotive air induction duct taken along a cross section of a flow path of an air induction passageway thereof.

In this embodiment shown in FIG. 6, in a strut portion 16, a center of a spherical abutting and sliding portion 10 is offset to the side of an air induction opening 2 (to a front side of the vehicle) relative to a center O of a root portion 11.

Due to this, the strut portion 16 is made to easily incline and fall towards the side of the air induction opening 2 along a direction in which an air induction passageway 3 extends. Due to this, in particular, when an external load is exerted on to the hood 5 at a position on the vehicle which lies further rearwards than the spherical abutting and sliding portion 10, whereby a pressure, which is directed forwards from the position further rearwards than the spherical abutting and sliding portion 10, is exerted on the spherical abutting and sliding portion 10 from an upper duct wall portion 1, the strut portion 16 is made to easily incline and fall in that direction by a lower load.

Other configurations, functions and advantages thereof are similar to those of Embodiment 1.

Other Embodiments

Note that while in the aforesaid embodiments, the abutting and sliding portion of the strut portion is described as being made up of the spherical abutting and sliding portion which can be brought into point contact with the upper duct wall portion, the abutting and sliding portion may be made up of a curved abutting and sliding portion which can be brought into line contact with the upper duct wall portion. In the case of the strut portion having the curved abutting and sliding portion, the strut portion is made to incline and fall easily by a pressure exerted thereon from both sides with a line disposed therebetween along which the upper duct wall portion and the curved abutting and sliding portion contact each other in a direction in which the pressure is exerted.

In addition, while in the aforesaid embodiments, the abutting and sliding portion is described as being offset relative to the root portion, the abutting and sliding portion may not be offset. However, in the event that the abutting and sliding portion is not offset relative to the root portion, when a pressure is exerted on to the abutting and sliding portion direct from thereabove in the vertical direction, the abutting and sliding portion is depressed to be collapsed while the strut portion inclines and falls in no case. However, since the case where the pressure is exerted in that way occurs extremely rarely, there will be caused realistically no problem.

Furthermore, the direction and degree at which the abutting and sliding portion is offset relative to the root portion, as well as the shape, size and thickness of the strut portion can be set appropriately.

What is claimed is:

1. An automotive air induction duct comprising:
    an upper duct wall portion disposed close to a back side of a hood of a vehicle;
    a lower duct wall portion disposed to oppositely face the upper duct wall portion at such an interval as to secure a required space therebetween so as, together with the upper duct wall portion, to form:
        an air induction opening which opens towards a front of the vehicle; and
        an air induction passageway which supplies outside air taken into from the air induction opening for an engine;
    a strut portion which rises integrally from the lower duct wall portion so as to be able to support the upper duct wall portion through abutment of a raised distal end portion thereof with the upper duct wall portion; and
    an abutting and sliding portion which is provided at the raised distal end portion of the strut portion in a non-joined state to a back side of the upper duct wall portion and is able to be brought into abutment with the back side by virtue of point contact or line contact and to slide relative to the back side.

2. The automotive air induction duct according to claim 1, wherein the strut portion is allowed to incline and fall obliquely downwards as the abutting and sliding portion is caused to slide relative to the back side and a root portion of the strut portion is deformed by a downward pressure exerted on to the abutting and sliding portion from the upper duct wall portion.

3. The automotive air induction duct according to claim 1, wherein the abutting and sliding portion is a spherical abutting and sliding portion which can be brought into abutment with the back side of the upper duct wall portion by virtue of point contact.

4. The automotive air induction duct according to claim 1, wherein the strut portion is such that a center of the abutting and sliding portion is offset relative to a center of a root portion of the strut portion.

5. The automotive air induction duct according to claim 4, wherein the center of the abutting and sliding portion is offset so as to be displaced deeper into the air induction passageway than the center of the root portion.

6. The automotive air induction duct according to claim 5, wherein the center of the abutting and sliding portion is offset on the order of 5 to 10 mm.

7. The automotive air induction duct according to claim 4, wherein the center of the abutting and sliding portion is offset to the side of an air induction opening relative to the center of the root portion.

8. The automotive air induction duct according to claim 1, wherein the strut portion is provided in the vicinity of the air induction opening.

9. The automotive air induction duct according to claim 1, wherein the upper duct wall portion and the lower duct wall portion comprise polyethylene or polypropylene.

10. The automotive air induction duct according to claim 1, wherein a thickness of the upper duct wall portion and the lower duct wall portion is in a range from 0.5 to 3.5 mm.

11. The automotive air induction duct according to claim 1, wherein an external shape of a cross section of the strut portion at the root portion is made substantially into an elliptic shape elongated in a direction directed from the air induction opening side towards the deeper side of the air induction passageway.

12. The automotive air induction duct according to claim 1,
    wherein the strut portion comprises a front wall portion and a rear wall portion oppositely face each other along a direction in which the air induction passageway extends, and
    wherein an inclination angle on the side of the front wall portion is made larger than an inclination angle on the side of the rear wall portion.

13. The automotive air induction duct according to claim 12, wherein an angle formed by an upper surface of the lower duct wall portion and an external surface of the rear wall portion is made to be smaller than 90 degrees.

14. The automotive air induction duct according to claim 12, wherein a length of the front wall portion is made longer than a length of the rear wall portion.

* * * * *